(12) United States Patent
Weldon, Jr.

(10) Patent No.: US 6,399,126 B1
(45) Date of Patent: Jun. 4, 2002

(54) FLAVORED BEVERAGE STIRRER

(76) Inventor: John Weldon, Jr., 65 Blanchard Rd., Marlton, NJ (US) 08053

( * ) Notice: Subject to any disclaimer, the term of this patent is extended or adjusted under 35 U.S.C. 154(b) by 0 days.

(21) Appl. No.: 09/760,122

(22) Filed: Jan. 16, 2001

(51) Int. Cl.[7] ............................................. A47J 31/40
(52) U.S. Cl. ........................ 426/134; 426/87; 426/421; 426/132
(58) Field of Search .................... 426/134, 132, 426/91, 110, 421, 115, 87

(56) References Cited

U.S. PATENT DOCUMENTS

| | | | | |
|---|---|---|---|---|
| 1,593,858 A | * | 7/1926 | Venable | 426/134 |
| 1,847,415 A | * | 3/1932 | Snell | 426/134 |
| 1,881,965 A | * | 10/1932 | Peterson | 426/134 |
| 1,919,692 A | * | 7/1933 | Falkendorf | 426/421 |
| 1,923,587 A | * | 8/1933 | Robb | 426/134 |
| 1,952,688 A | * | 3/1934 | Schnaier | 426/134 |
| 1,980,588 A | * | 11/1934 | Hopp | 426/134 |
| 2,030,126 A | * | 2/1936 | Vogt | 426/132 |
| 2,281,267 A | * | 4/1942 | Chapman | 426/134 |
| 2,417,480 A | * | 3/1947 | Friedman | 426/134 |
| 2,980,039 A | * | 4/1961 | Jolly | 426/134 |
| 3,469,997 A | * | 9/1969 | Rossi et al. | 426/134 |
| 3,869,555 A | * | 3/1975 | Heonis | 426/134 |
| 4,018,902 A | * | 4/1977 | Dee | 426/134 |
| 4,849,231 A | * | 7/1989 | Spee | 426/134 |
| D393,566 S | * | 4/1998 | Buehner | 426/134 |
| 5,740,912 A | * | 4/1998 | Chen | 426/110 |
| 6,190,226 B1 | * | 2/2001 | Conconi | 426/134 |

FOREIGN PATENT DOCUMENTS

| | | | | |
|---|---|---|---|---|
| DE | 368697 | * | 2/1923 | 426/134 |
| DE | 3034017 | * | 4/1982 | 426/134 |
| FR | 2296391 | * | 9/1976 | 426/134 |
| FR | 2583968 | * | 1/1987 | 426/134 |
| GB | 24092 | * | 10/1909 | 426/134 |
| GB | 279758 | * | 11/1927 | 426/134 |
| IT | 500005 | * | 11/1954 | 426/110 |

* cited by examiner

*Primary Examiner*—Steven Weinstein
(74) *Attorney, Agent, or Firm*—Norman E. Lehrer

(57) ABSTRACT

A flavored beverage stirrer which includes a carrier and a cartridge is disclosed. The carrier includes a cap to which is attached an elongated member or wand with barbs or protrusions extending outwardly from the length thereof. The stirrer also includes a cartridge formed from a flavored material. The cartridge is generally in the shape of a cylinder with a hole extending therethrough. The cartridge is placed onto the wand so that the barbs of the wand fit within grooves formed within the hole of the cartridge thereby retaining the cartridge on the elongated member. The stirrer may now be placed within a cup or mug of a hot beverage. As the stirrer is swirled through the beverage, the flavored cartridge dissolves and adds flavor to the beverage.

2 Claims, 2 Drawing Sheets

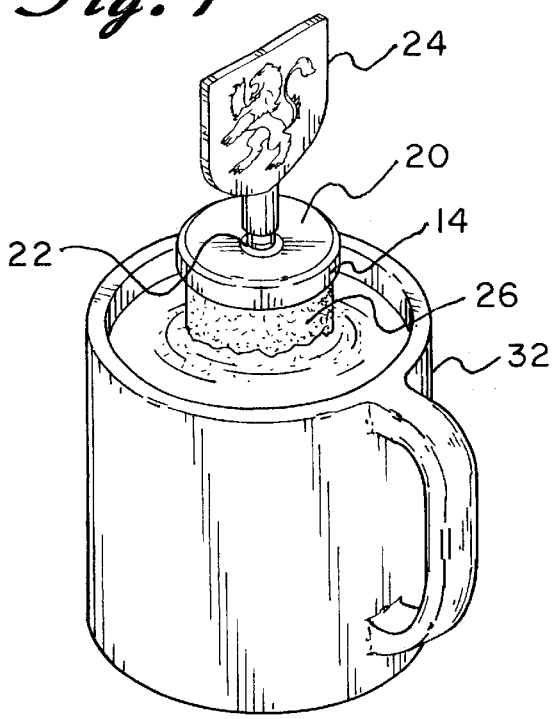
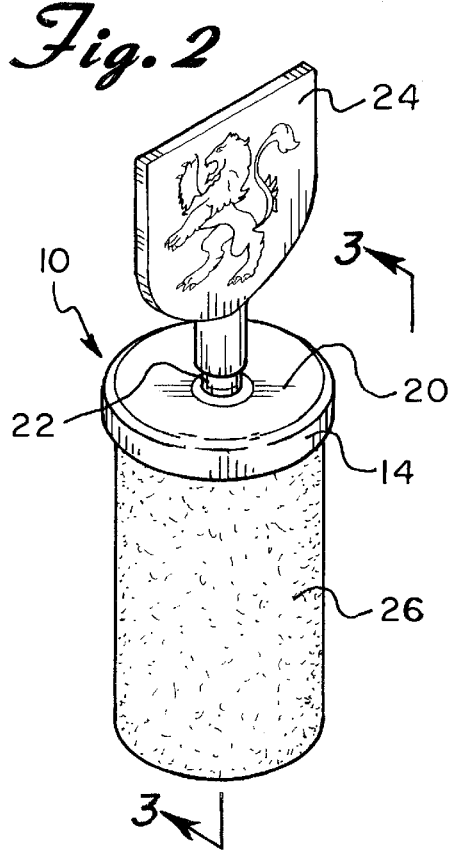
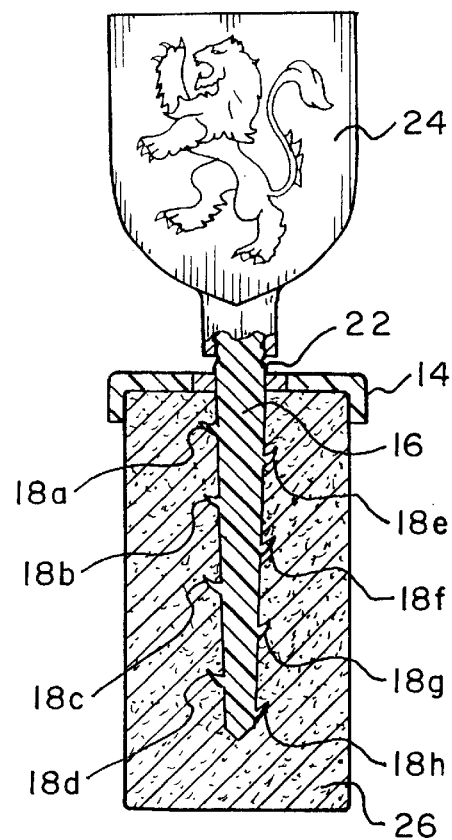

FLAVORED BEVERAGE STIRRER

BACKGROUND OF THE INVENTION

The present invention is directed toward a stirrer for a hot beverage and more particularly, toward a flavored stirrer which adds a particular flavor to a hot beverage.

Traditionally, hot beverages have been flavored using tea leaves, cocoa powder, coffee beans, or the like which have a particular flavor mixed therewith. The problem with such methods is that the leaves, powder, or beans are usually sold in bulk so that the freshness of the flavor may not be maintained.

Another method for providing flavored tea, cocoa, or coffee is to use a stick which contains a flavorant thereon and is used as a stirrer for the beverage as disclosed, for example, in U.S. Pat. No. 3,869,555 to Heonis. The particular flavor of the stick is released into the beverage as it is stirred therein. The problem with this type of stirrer is that the flavored particles may fall off of the stick prior to completely dissolving. As a result, the flavored particles which are released may come off of the stick in lumps, thereby preventing the flavor from being uniformly dispersed throughout the beverage.

Another type of flavoring method, used particularly with coffee, is a spoon covered in chocolate. The spoon is used to stir a cup of coffee, thereby adding flavor to the coffee. The problem with this method is that the chocolate may melt too quickly and thereby release too much of the chocolate into the coffee.

A need exists for a way to flavor a hot beverage which eliminates the drawbacks of the prior art methods discussed above.

SUMMARY OF THE INVENTION

The present invention is designed to overcome the deficiencies of the prior art discussed above. It is an object of the present invention to provide a reusable stirrer which adds flavor to a hot beverage in a uniform manner.

It is a further object of the invention to provide a flavored stirrer which may be custom designed.

In accordance with the illustrative embodiments demonstrating features and advantages of the present invention, there is provided a stirrer which includes a carrier and a cartridge. The carrier includes a cap to which is attached an elongated member or wand with barbs or protrusions extending outwardly from the length thereof. The stirrer also includes a cartridge formed from a flavored material. The cartridge is generally in the shape of a cylinder with a hole extending therethrough. The cartridge is placed onto the wand so that the barbs of the wand fit within grooves formed within the hole of the cartridge, thereby retaining the cartridge on the elongated member. The stirrer may now be placed within a cup or mug of a hot beverage. As the stirrer is swirled through the beverage, the flavored cartridge dissolves and flavors to the beverage.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the stirrer of the present invention placed within a mug;

FIG. 2 is a perspective view of the stirrer of the present invention;

FIG. 3 is a cross-sectional view taken through line 3—3 of FIG. 2;

DETAILED DESCRIPTION OF THE PREFERRED EMBODIMENT

Figure 4:
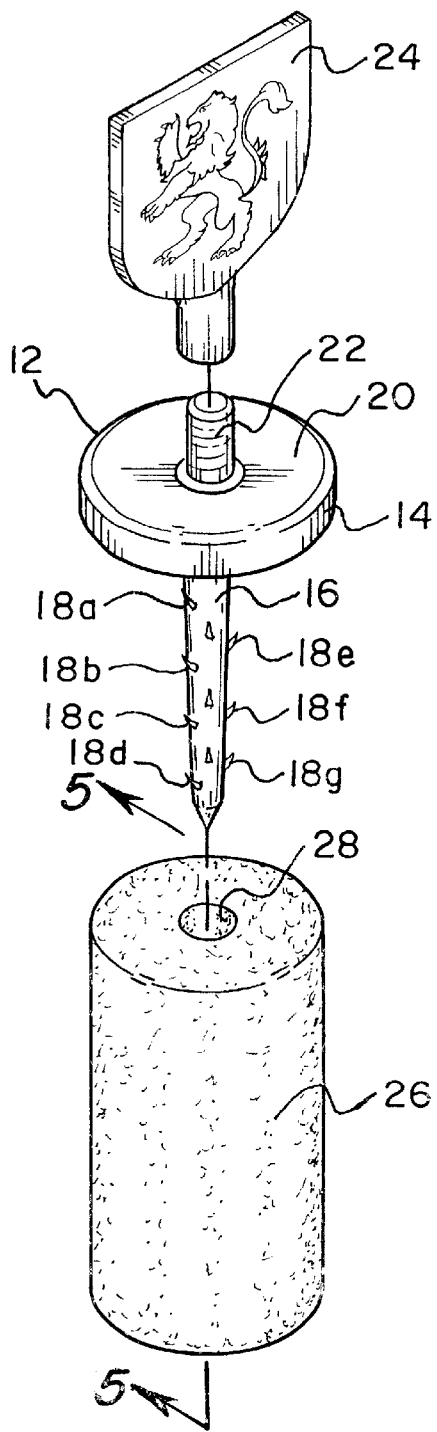
FIG. 4 is an exploded view of the stirrer of the present invention.

Referring now to the drawings in detail wherein like reference numerals have been used throughout the various figures to designate like elements, there is shown in FIG. 2 a stirrer constructed in accordance with the principles of the present invention and designated generally as 10.

The stirrer of the present invention essentially includes a carrier 12 having a generally circular cap 14 with a generally circular top and downwardly extending cylindrical sidewalls and an elongated member or wand 16 extending downwardly from the cap. (See FIG. 4.) Extending outwardly from the length of the wand 16 are barbs or protrusions, shown for example, as barbs 18a–18h. The cap 14 and elongated member 16 are made from metal or plastic or the like material. The plastic may be polyethylene, polypropylene, or other heat-resistant, tasteless, non-toxic plastic.

Extending upwardly from the center of the top surface 20 of the cap 14 is means for releasably securing 22 a decorative object 24 thereto. (See FIG. 4.) The securing means may be of the type known in the art, for example, screw threads. The decorative object secured to the cap may include a figure, an animal, a holiday ornament, a family crest, or the like. In this manner the stirrer may be designed to suit the needs of the user.

Figure 5:
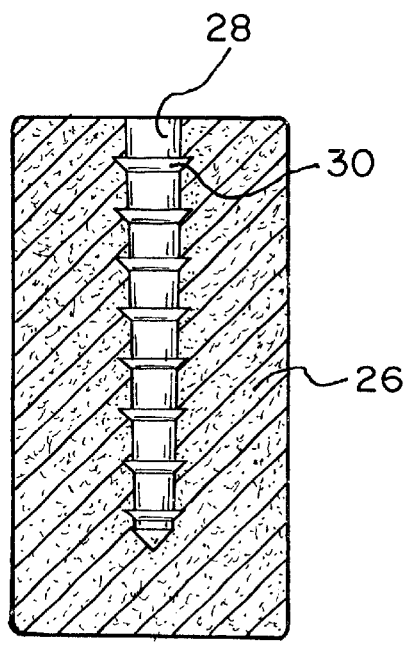
FIG. 5 is a cross-sectional view taken through line 5—5 of FIG. 4.

The stirrer also includes a cartridge 26 formed from a flavored material. The cartridge 26 is generally in the shape of a cylinder with a hole 28 extending therein in the axial direction. (See FIG. 4.) The hole 28, however, does not extend through the entire length of or the bottom of the cartridge 26. (See FIG. 5.) The hole also has grooves, recesses, threads, or the like formed therein such as shown at 30. The purpose of the grooves or recesses will be discussed in greater detail below. The cartridge 26 is made from a flavored material. For example, the flavored material may be granulated sugar to which a particular flavor has been added. Any type of flavorant may be used. Alternatively, the flavored material may be a medicament such as a cough suppressant, cold remedy, or the like.

In order to use the stirrer of the present invention, the wand 16 is placed within the hole 28 of the cartridge 26. (See FIG. 4.) In this manner the barbs 18a–i 8h of the wand 16 fit within the recesses 30 formed within the hole 28 of the cartridge 26. The cartridge 26 is now retained on the elongated member 16. (See FIG. 2.) The top of tie cap 14 fits over and contacts the top of die flavored cartridge 26 and the sidewalls fit over the side of the cartridge adjacent the top so that liquid is prevented from passing over the top of the cartridge and entering the hole 28, thereby preventing the cartridge 26 from dissolving too quickly. (See FIG. 3.)The stirrer may now be placed within a cup or mug 32 of a hot beverage. (See FIG. 1.) As the stirrer is swirled through the beverage, the flavored cartridge 26 dissolves thereby adding flavor to the beverage. Once the flavored material has dissolved completely, the carrier may be removed and used again with another cartridge.

The present invention may be embodied in other specific forms without departing from the spirit or essential attributes thereof and accordingly, reference should be made to the appended claims rather than to the foregoing specification as indicating the scope of the invention.

I claim:

1. A stirrer for flavoring a hot beverage comprising:

a reusable carrier having a cap and an elongated member extending downwardly from said cap, said elongated member including protrusions extending outwardly therefrom, said cap having a generally circular top and a downwardly extending cylindrical sidewall, and a dissolvable, substantially cylindrically shaped, preformed cartridge having a hole in the top thereof extending in the axial direction, said hole extending only partially into said cartridge and not extending through the bottom thereof, said cartridge formed from a flavorant, said elongated member including said protrusions being placed in said hole of said preformed cartridge and extending within said hole of said cartridge with said protrusions retaining said cartridge on said carrier;

wherein said generally circular top of said cap contacts the top of said cartridge and said sidewall fits over the side of said cartridge adjacent the top thereof sufficient to prevent liquid from passing over the top of said cartridge and into said hole thereby preventing the cartridge from dissolving too quickly when said stirrer is swirled through a beverage to dissolve the cartridge and flavor the beverage.

2. The stirrer for a hot beverage of claim 1 wherein said cap of said carrier further includes means for releasably securing a decorative object thereto.

* * * * *